(12) United States Patent
Dolan et al.

(10) Patent No.: US 11,297,507 B2
(45) Date of Patent: Apr. 5, 2022

(54) CO-LOCATION SECURITY SYSTEM

(71) Applicant: BANK OF AMERICA CORPORATION, Charlotte, NC (US)

(72) Inventors: Heather Roseann Dolan, Sarasota, FL (US); Katherine Dintenfass, Lincoln, RI (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 308 days.

(21) Appl. No.: 16/447,488

(22) Filed: Jun. 20, 2019

(65) Prior Publication Data

US 2020/0404488 A1    Dec. 24, 2020

(51) Int. Cl.
| | |
|---|---|
| *H04W 12/63* | (2021.01) |
| *H04W 4/80* | (2018.01) |
| *H04W 4/021* | (2018.01) |
| *H04W 12/06* | (2021.01) |
| *H04W 12/67* | (2021.01) |

(52) U.S. Cl.
CPC ........... *H04W 12/63* (2021.01); *H04W 4/021* (2013.01); *H04W 4/80* (2018.02); *H04W 12/06* (2013.01); *H04W 12/67* (2021.01)

(58) Field of Classification Search
CPC ..... H04W 12/06; H04W 12/08; H04W 12/61; H04W 12/63; H04W 12/67; H04W 4/021; H04W 4/80; H04W 48/02; H04W 48/04; G06F 21/31; G06F 21/34; G06F 21/35; G06F 21/60; G06F 2221/2111; G06F 21/43; H04L 63/10; H04L 63/107; G06Q 20/20; G06Q 20/3224; G06Q 20/327; G06Q 20/3278; G06Q 20/34; G06Q 20/4015

See application file for complete search history.

(56) References Cited

U.S. PATENT DOCUMENTS

| | | | | |
|---|---|---|---|---|
| 6,088,450 | A | * | 7/2000 | Davis ................ G07C 9/28 713/182 |
| 6,612,488 | B2 | | 9/2003 | Suzuki |
| 6,913,194 | B2 | | 7/2005 | Suzuki |
| 8,417,631 | B2 | | 4/2013 | Hoffman et al. |
| 8,494,968 | B2 | | 7/2013 | Hammad et al. |
| 8,919,643 | B2 | | 12/2014 | Ashfield |
| 9,251,637 | B2 | | 2/2016 | Ashfield |
| 9,477,959 | B2 | | 10/2016 | Ashfield |
| 9,501,774 | B2 | | 11/2016 | Ashfield |

(Continued)

*Primary Examiner* — Minh Dinh
(74) *Attorney, Agent, or Firm* — Moore & Van Allen PLLC; Jeffrey R. Gray

(57) ABSTRACT

An interaction security system for user verification utilizes co-location in order to more accurately identify a user location. The system identifies a user computer system location based a location determination component for the user computer systems. Moreover, the system identifies a resource accessory location of a resource accessory. The resource accessory location may be determined in a number of different ways, including, but not limited to, a location determination component of the resource accessory. The system may utilize a time requirement and/or a geo-location requirement in order to maintain verification of the user for a period of time and/or within a specific location. Moreover, the system may require the user to take an action with respect to the resource accessory before verifying the user location for an interaction.

20 Claims, 3 Drawing Sheets

(56) References Cited

U.S. PATENT DOCUMENTS

| | | | |
|---|---|---|---|
| 9,582,802 B2 | 2/2017 | Bachenheimer et al. | |
| 9,680,942 B2 | 6/2017 | Dimmick | |
| 9,858,565 B1* | 1/2018 | Zettner | G06Q 20/382 |
| 9,858,567 B2 | 1/2018 | Stanfield et al. | |
| 9,911,116 B1* | 3/2018 | Lewis | G06Q 20/204 |
| 10,037,516 B2 | 7/2018 | Mardikar et al. | |
| 10,068,226 B2 | 9/2018 | Chandrasekaran | |
| 2013/0091537 A1* | 4/2013 | Parla | H04L 63/10 726/1 |
| 2016/0171499 A1* | 6/2016 | Meredith | G06Q 20/3224 705/44 |
| 2016/0269403 A1* | 9/2016 | Koutenaei | H04L 63/107 |
| 2016/0292666 A1* | 10/2016 | Chauhan | G06Q 20/204 |
| 2020/0143371 A1* | 5/2020 | Ranganathan | G06Q 20/40 |

* cited by examiner

CO-LOCATION SECURITY SYSTEM

FIELD

The present invention relates to security for interactions, and more particularly, to a co-location security system for verifying entities for interactions.

BACKGROUND

Identifying entities involved in interactions with more accuracy reduces the potential for misappropriation of information and/or resources. Many ways to identify entities have by contemplated, however, many of these traditional ways to identify entities may be limited, inaccurate, and/or costly. Moreover, these traditional ways of identifying entities may be subject to potential misappropriation by users trying to imitate the entities and/or assert themselves within the interactions.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer implemented methods, and computer products are described herein for an interaction security system for user verification that utilizes co-location in order to more accurately identify a user location. The system identifies a user computer system location based a location determination component for the user computer systems. Moreover, the system identifies a resource accessory location of a resource accessory. The resource accessory location may be determined in a number of different ways, including, but not limited to, a location determination component of the resource accessory. The system may utilize a time requirement and/or a geo-location requirement in order to maintain verification of the user for a period of time and/or within a specific location. Moreover, the system may require the user to take an action with respect to the resource accessory before verifying the user location for an interaction.

Embodiments of the invention comprise systems, computer implemented method, and/or computer program products for an interaction security system for user verification. The invention comprises receiving an indication of an interaction involving a user, wherein the user entered the interaction through a user computer system. The invention further comprises identifying a user computer system location, and a resource accessory location of a resource accessory of the user. The invention further comprises determining when the user computer system location and the resource accessory location meet a location requirement, and verifying the user for the interaction when the location requirement is met.

In further accord with embodiments of the invention, upon the verification of the user a time requirement is set in which a plurality of future interactions fail to require additional verification.

In other embodiments of the invention, upon the verification of the user a geo-fenced requirement is set in which a plurality of future interaction fail to require additional verification.

In still other embodiments, the invention further comprises allowing the interaction when the location requirement is met and preventing the interaction when the location requirement fails to be met.

In yet other embodiments, the invention further comprises receiving an indication of a second interaction involving the user and determining a time requirement for allowing subsequent interactions. The invention also further comprises determining when a second interaction time of the second interaction meets the time requirement and verifying the user for the second interaction when the time requirement is met.

In other embodiments, the invention further comprises allowing the second interaction when the time requirement is met. However, when the time requirement fails to be met the invention further comprises identifying the user computer system location and identifying the resource accessory location again. The invention further comprises determining when the user computer system location and the resource accessory location meets the location requirement and verifying the user for the second interaction when the location requirement is met.

In further accord with embodiments, the invention further comprises receiving an indication of a second interaction involving the user and determining a geo-fenced requirement for allowing subsequent interactions. The invention further comprises determining when a second interaction location of the second interaction meets the geo-fenced requirement and verifying the user for the second interaction when the geo-fenced requirement is met.

In other embodiments, the invention further comprises allowing the second interaction when the geo-fenced requirement is met. However, when the geo-fenced requirement fails to be met the invention further comprises identifying the user computer system location and identifying the resource accessory location. The invention further comprises determining when the user computer system location and the resource accessory location meets the location requirement and verifying the user for the second interaction when the location requirement is met.

In still other embodiments of the invention, the resource accessory comprises a resource instrument, and the resource accessory location is based on a last interaction in which the resource instrument was utilized.

In yet other embodiments of the invention, the resource accessory comprises a location determination component, and the resource accessory location is based on the location determination component in the resource accessory.

In other embodiments of the invention, the location determination component utilizes global positioning satellites (GPS), WiFi triangulation, near-field communication, or z-wave.

In further accord with embodiments, the invention further comprises prompting the user to take an action with the resource accessory, receiving an indication of the action from the resource accessory that the action is completed, and wherein verification of the user is not completed until the action on the resource accessory is completed.

In other embodiments of the invention, the action on the resource accessory comprises turning the resource accessory on, entering a password into the resource accessory, making a gesture on the resource accessory, or entering a pin from the resource accessory into the user computer system.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
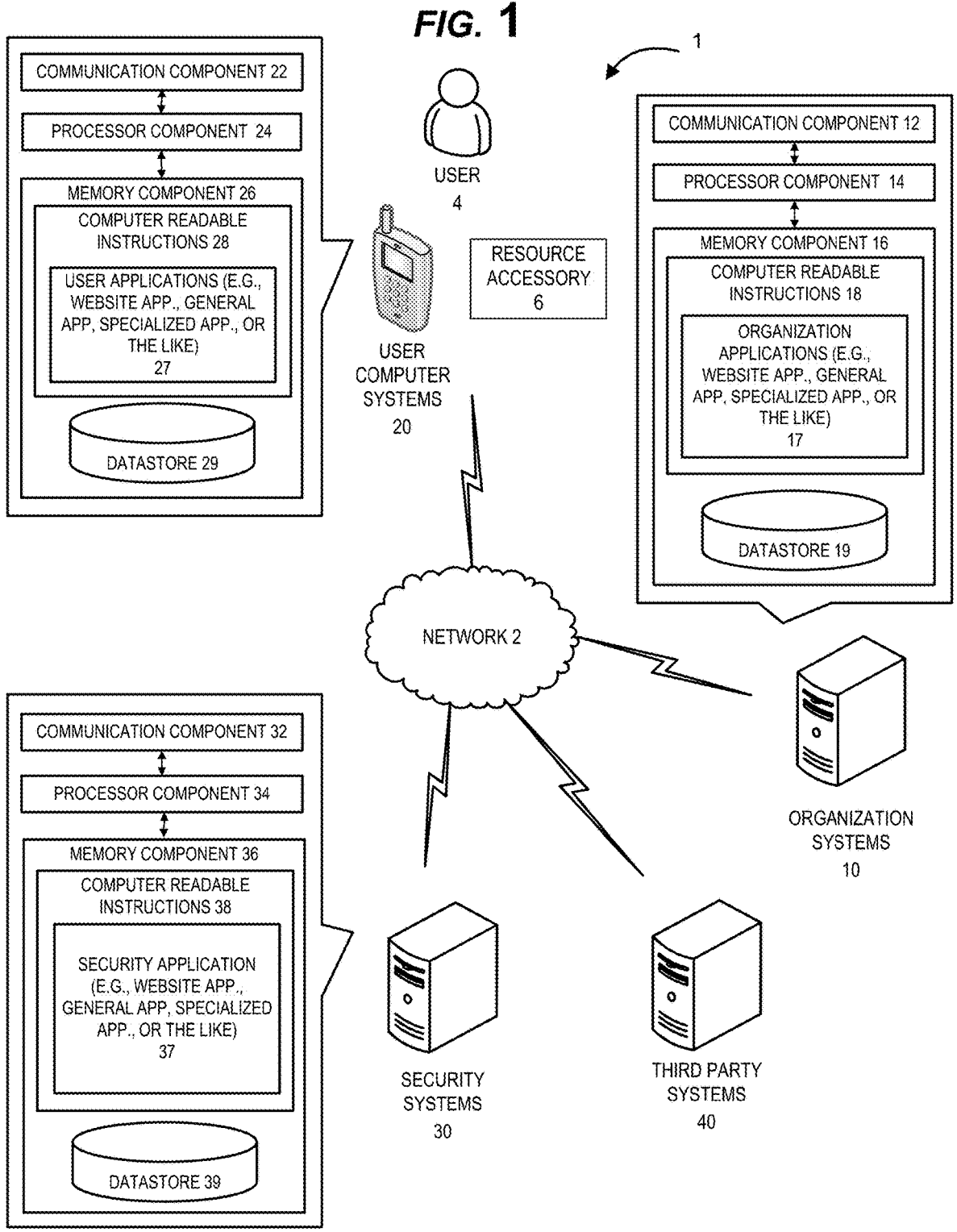

Having thus described embodiments of the invention in general terms, reference will now be made to the accompanying drawings, and wherein:

FIG. 1 illustrates a block diagram of an interaction security system environment, in accordance with one or more embodiments of the invention.

Figure 2:
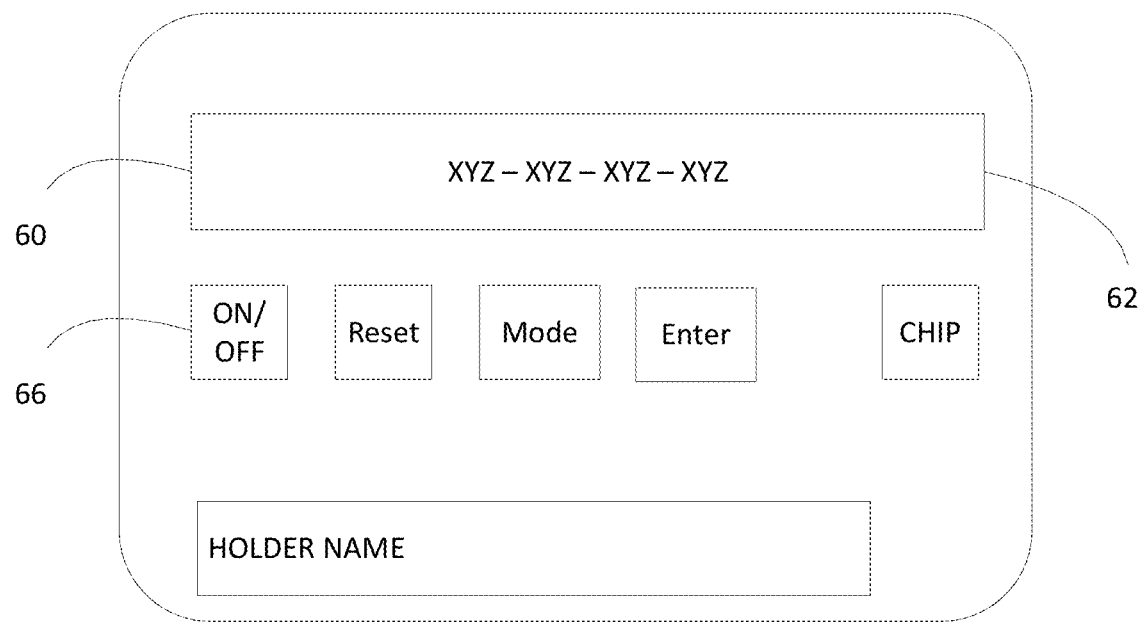
Figure 2:
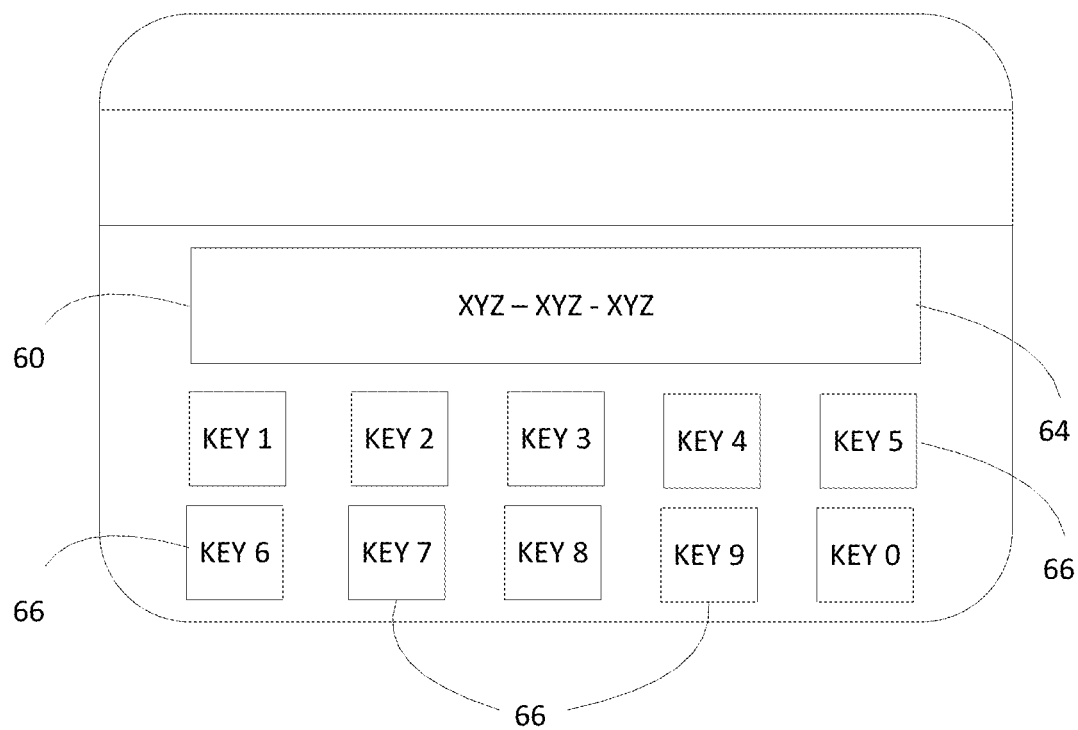

FIG. 2 illustrates a resource accessory, in accordance with one or more embodiments of the invention.

Figure 3:
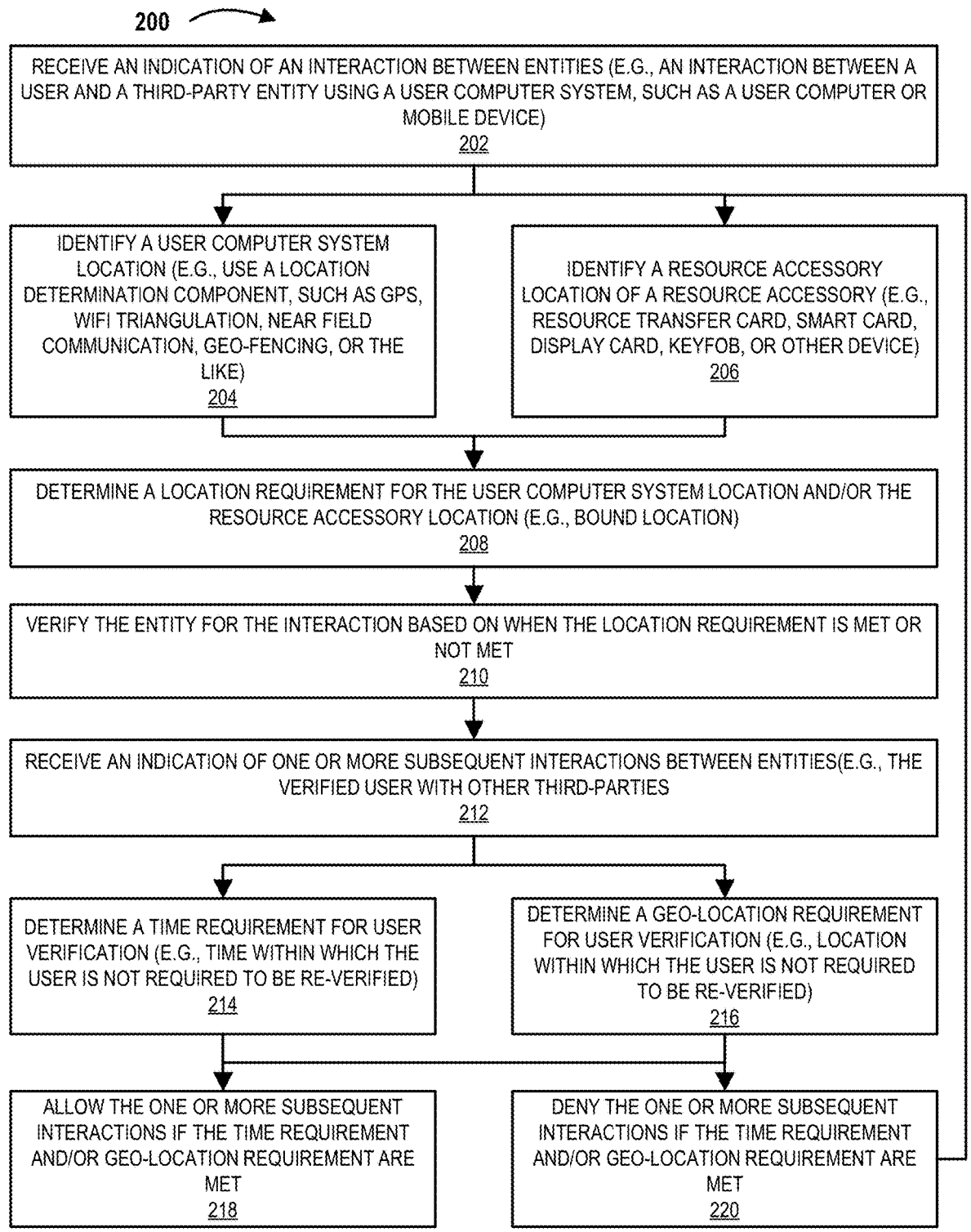

FIG. 3 illustrates a co-location interaction verification process, in accordance with one or more embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Generally, systems, computer implemented methods, and computer products are described herein for a co-location system that more accurately identifies a user location. As will be described herein, a user may enter into an interaction with a third-party entity for a product (e.g., good or service). The system identifies a user computer system location (e.g., a user's mobile device location) based a location determination component for the user computer system (e.g., GPS, WiFi-triangulation, Near-field communication, geo-fencing, or the like). Moreover, the system identifies a resource accessory location of a resource accessory (e.g., accessory used to enter into interactions, such as, a card, smart card, or other like accessory). The resource accessory location may be determined in a number of different ways, including, but not limited to, a location determination component of the resource accessory (e.g., GPS, WiFi-triangulation, Near-field communication, geo-fencing, rotating resource number, CVV number, or the like), the locations of the interaction in which the resource accessory has been used, locations set by the user, or the like. It should be further understood that a time requirement and/or a geo-location requirement may be set by the user in order to maintain the verification of the user for a period of time and/or within a location without requiring a new verification. Moreover, the system may require the user to take an action with respect to the resource accessory before verifying the for an interaction.

FIG. 1 illustrates an interaction security system environment 1, in accordance with embodiments of the invention. As illustrated in FIG. 1, one or more organization systems 10 are operatively coupled, via a network 2, to one or more user computer systems 20, one or more security systems 30, one or more third party systems 40, one or more resource accessories 6 (in some embodiments as will be described herein), and/or one or more other systems (not illustrated). It should be understood that the interaction security system environment 1 allows for improved security through improved identification of one or more entities involved within an interaction.

It should be understood that the one or more organization systems 10 may be the systems that that the organization uses to operate the organization. The users 4 (e.g., one or more associates, employees, agents, contractors, sub-contractors, third-party representatives, customers, or the like), may include customers or employees of the organization, the third-parties, and/or the like. The users 4 may use the user computer systems 20 to communicate with the other systems and devices (e.g., organization systems 10, other user computer systems 20, resource accessories 6—in some embodiments, third-party systems 40, and/or other systems) and/or components thereof. The one or more security systems 30 may be used by the organization and/or the users 4 in order to more accurately identify entities involved in an interaction and/or allow interactions for a time period after verification of the entities. The third-party systems 40 may include the systems of parties outside of the organization, such as the systems 40 of one or more of the entities involved in the interaction. Alternatively, the third-party systems 40 may further include intermediaries involved in the communications between the systems. The other systems (not illustrated), may include the systems that are used to send, receive, or take other actions with respect to the security and/or the interactions.

The one or more networks 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more security systems 30, the one or more third party systems 40, the one or more resource accessories 6, and/or other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., Web-based applications, dedicated applications, specialized applications, or the like that are used to operate the organization, which may be internal and/or external applications). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for operating the organization (e.g., the external and/or internal operation of the organization), such as by communicating (e.g., interacting with) the one or more user computer systems 20 and user applications 27, the one or more security systems 30 and personal information applications 37, the one or more third party systems 40 and applications thereof (not illustrated), the resource accessories 6 and/or applications thereof (not illustrated), and/or other systems and applications thereof (not illustrated). It should be understood that the one or more organization applications 17 may comprise the applications that are used by the organization to run operations of the business, including the applications used to manage, track, and/or secure resources of an entity (e.g., a user or other customer), and facilitate the exchange of resources of the entity with other entities.

As further illustrated in FIG. 1, the one or more user computer systems 20 are operatively coupled, via a network 2, to the one or more organization systems 10, the one or more personal information systems 30, the one or more third party systems 40, the one or more resource accessories 6, and/or the one or more other systems. As illustrated in FIG. 1, users 4 may use the one or more user computer systems 20 to communicate with the one or more organization systems 10, the one or more security systems 30, the one or more third party systems 40, the one or more resource accessories 6, and/or other systems in order to allow the user to enter into interactions with others (e.g., the third-party entities), as will be discussed herein.

It should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, one or more memory components 26, and/or the one or more user applications 27, such as web browser applications, dedicated applications, specialized applications, or portions thereof. The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more security systems 30, the one or more third party systems 40, the one or more resource accessories 6, and/or other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and/or the like. Moreover, the one or more communication components 22 may include a keypad, keyboard, touchscreen, touchpad, microphone, speaker, mouse, joystick, other pointer, button, soft key, and/or other input/output(s) for communicating with the users 4. Moreover, the one or more user computer systems 20 may comprise one or more location determination components (e.g., GPS component, WiFi triangulation, geo-fencing, near field communication, Bluetooth, other components and/or applications that may be used to identify the location of the user computer system), which may be separate components or may be described as one of the one or more communication components 22.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications, or the like that allow the one or more user computer systems 20 to perform the actions described herein (e.g., communicate with other systems for allowing determination of a user computer system location, entering interactions, completing interactions, or the like).

It should be further understood that the one or more resource accessories 6 may be any accessory that allows a user (e.g., individual user or entity user acting on behalf of an entity) to enter into interactions in which the resource accessory 6 allows the user to exchange resources with another entity in accordance with an interaction. In some embodiments, the resource accessory 6 may be a traditional card (e.g., credit card, debit card, merchant card, and/or any other type of card). In other embodiments, the resource accessory 6, as illustrated in FIG. 2, may be an electronic card that has one or more processor components, one or more memory components, and/or one or more communication components (e.g., key pad, or the like as discussed herein), and in some cases one or more internal power components (e.g., chargeable, kinetic, heat, solar, or other like power source). Moreover, the resource accessory 6 may further comprise a one or more displays 60 that allow for the display of an interface. As such, in some embodiments the accessory 6 may be a display card, smartcard, payment fob, or other like payment device that may be utilized in order to enter into interactions. In some embodiments the resource accessory 6 may be a display card that provides resource information (e.g., a CVV number, card number, pin number, or the like) in a front face display 62 and/or a rear face display 64 that is static or dynamically changes. Moreover, the one or more resource accessories 6 may include one or more inputs 66 (e.g., keys of characters, buttons, touch screen interface, or the like), that allow the user 4 into input characters (e.g., number, letters, symbols, or the like) into the one or more interfaces on the displays 60 of the one or more resource accessories 6 (e.g., pin numbers, on/off, reset resource number, CVV, request new codes, and/or the like). Moreover, the one or more inputs 66 may include function keys for performing other functions associated with the resource accessory 60, such as but not limited to on/off, reset, mode, enter, or the like inputs 66. Additionally, the resource accessory 6 may include other features of traditional cards, such as but not limited to a permanent resource number (e.g., card number), the holder name, magnetic stripe, data chip, or the like.

In some embodiments, the one or more resource accessories 6 may include a location determination component, as previously described herein with respect to the user computer systems 20. The location determination component may be utilized to identify a location of the resource accessory 6 (e.g., the current location, a recent location—such as a location within a time frame, or the like). It should be understood that the resource accessory 6 may be used along with the user computer system 20 to provide improved security features, as will be described herein in further detail.

As further illustrated in FIG. 1, the one or more security systems 30 are operatively coupled, via a network 2, to the one or more organization systems 10, the one or more user computer systems 20, the one or more third party systems 40, the one or more resource accessories 6, and/or other systems. The one or more security systems 30, as will be described in further detail herein, may be utilized in order to provide improved security features for interactions, such as in order to more accurately identify the entities participating in an interaction, and in particular, an interaction occurring over the Internet, as will be discussed in further detail herein.

The security systems 30 generally comprise one or more communication components 32, one or more processor components 34, and one or more memory components 36. The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, the one or more third party systems 40, the one or more resource accessories 6, and/or the one or more other systems (not illustrated). As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more security systems 30 may have computer-readable instructions 38 stored in the one or more memory components 36, which in some embodiments includes the computer-readable instructions 38 of one or more security applications 37 that are used to provide improved security features, such as improved tracking and/or identification of the entities involved in an interaction, as will be discussed herein.

Moreover, the one or more third party systems 40, the one or more resource accessories 6 (as described above) and/or the one or more other systems may be operatively coupled to and communicate with the one or more organization systems 10, the one or more user computer systems 20, and/or the one or more security systems 30, through the one or more networks 2. The one or more third party systems 40, the one or more resource accessories 6, and/or the one or more other systems may have the same or similar components as the one or more organization systems 10, the one or more user computer systems 20, and/or the one or more personal information systems 30 (e.g., communication component, processor component, memory component—computer readable instructions for applications, datastore). As such, the one or more third party systems 40, the one or more resource accessories 6, and/or the one or more other systems may communicate with the one or more organization systems 10, the one or more user computer systems 20, the one or more security systems 30, and/or each other in the same or similar way as previously described with respect to the one or more organization systems 10, the one or more user computer systems 20, and/or the one or more security systems 30.

It should be understood that the one or more third party systems 40 may comprise the systems of third-party entities, such as but not limited to, merchants, intermediaries, or the like. In this way, the third-party systems 40 may or may not be affiliated with the users 4 and/or user computer systems 20. In some embodiments, as will be described herein, the third parties may be the merchants with which the users 4 may enter into interactions for products (e.g., goods and/or services), and thus, before entering into interactions with the users 4 the third-parties may want confirmation that the user 4 is who the user 4 says he/she is.

FIG. 3 illustrates a process flow for a co-location security system for verification of a user 4 involved in an interaction. As illustrated in block 202 of FIG. 3, an indication of an interaction between entities is received. For example, a first entity may be a user 4 that may enter into an interaction (e.g., transaction) with a second entity (e.g., a third-party, such as a merchant). The user 4 may enter into the interaction using the user computer system 20 (e.g., a computer, a mobile device, or the like). For example, the user 4 may use the user computer system 20 to access a merchant website through the user computer system 20 to enter into an interaction with the third-party. While the present invention may be described with respect to an interaction over the Internet, the present disclosure may be utilized for any interaction that is a "card-not-present interaction" (e.g., any interaction in which the user 4 is not using a physical resource accessory 6 for the interaction, such as not using a physical card).

FIG. 3 further illustrates in block 204 that a user computer system location is identified. For example, as described herein, a location determination component is used, such as GPS, WiFi triangulation, near field communication, geo-fencing, or the like, in order to determine the location of the user 4. For example, the user's location may be determined when the user 4 entered into the interaction. As such, the user 4 may be identified as being located at and/or within a first location when entering into an interaction.

Block 206 of FIG. 3 further illustrates that a resource accessory location of the resource accessory 6 is identified. As described herein, the resource accessory 6 may be a physical card, and the resource accessory location may be based on the location of the last interaction in which the resource accessory 6 was used. Alternatively, and more particularly, the resource accessory location may be based on a location determination component of the resource accessory 6, which identifies the location of the resource accessory. As such, the location of the resource accessory 6 may be determined within a time period related to the interaction in which the user 4 entered (e.g., the resource accessory location at the actual time, or a time range, such as within 1, 2, 4, 6, 8, 10, 15, 20, 25, 30, 60 or the like minutes, when the user 4 enters into an interaction with the user computer system 20). It should be understood that the resource accessory location provides a second indication of the user location in order to provide verification of the user identity when the user enters into an interaction.

Block 208 of FIG. 3 illustrates that a location requirement for the user computer system and/or the resource accessory location is identified. The location requirement may include a boundary (e.g., non-uniform boundary, or a uniform boundary, such as circular, or the like) in which the user computer system 20 and resource accessory 6 are required to be located within in order to verify the user entering the interaction. For example, the boundary may be within feet, such as 20, 50, 100, or the like feet; miles, such as 1, 2, 4, 6, 8, 10, 15, 20, 25, 30, 40, 50, 75, 100, or the like miles; within the same city, county, state, region, or other like boundary. The boundary may be set based on geography, such as the location of the user's house, business, car, or the like, or may be set by the location of the user computer system 20 or the resource accessory 6. For example, the user computer system 20 may be center of the interaction since the user computer system 20 is being used to enter into the interaction, and the resource accessory 6 must be within the boundary. The location requirement (e.g., the boundary, or the like) may be set by the user 4, the organization, the entity responsible for the security system 30 (e.g., the organization or another entity), or a combination thereof.

Block 210 of FIG. 3 illustrates that the user 4 is verified or not verified for the interaction based on when the location requirement is met or fails to be met. For example, when the location requirement is met, such as the user computer system location and the resource accessory location are within the defined boundary, the user 4 may be verified for the interaction. Thereafter, should other requirements for the interaction be met (e.g., resources available, product availability, other security requirements—login, passwords, or the like) the interaction may be allowed.

Alternatively, or in addition to the location requirement, the user may be required to take one or more actions with respect to the resource accessory before the user is verified for the interaction. The resource accessory action may require any number of one or more actions. The resource accessory action may include requiring the user 4 to turn on the resource accessory utilizing one or more inputs 66 (e.g., an on/off input). The resource accessory action may include entering a password into the resource accessory utilizing one or more inputs 66 (e.g., keys inputs, such as the numbered keys). The resource action may include making a gesture on the resource accessory utilizing one or more inputs 66 (e.g., making a gesture on a touch screen). The resource accessory may further include taking a pin (e.g., numbers, characters, symbols, including a token account number, rotating CVV number, a randomized number, or the like) from the resource accessory display (e.g., from the one or more displays, such as front face display 62, a rear face display 64, or the like), and entering the pin into the user computer system 20 (e.g., the mobile device with which the user may be entering in the interaction). As such, it should be understood that the organization systems 10, the resource security systems 30, and/or the third party systems 40 may verify the action involving the resource accessory 6 has occurred and/or is correct (e.g., the correct action was taken, such as the correct password was entered into the resource accessory, the gesture was correct, and/or the pin entered into the user computer system was correct).

FIG. 3 further illustrates in block 212 that after verification of a user 4 an indication may be received of one or more subsequent interactions between the user 4 and one or more third party entities. For example, after being verified for a first interaction, the user 4 may enter into one or more other interactions with one or more entities (e.g., the same entity and/or other entities).

Block 214 of FIG. 3 illustrates that in some embodiments a time requirement for user verification is determined. The time requirement may include a time period within which the user 4 that was previously verified may remain verified such that the subsequent interactions do not require re-verification using the location requirement. The time period may include minutes, hours, days, or the like, such as 5, 10, 15, 20, 25, 30, 35, 40, 45, 50, 55, 60, or the like minutes, 1.5, 2, 3, 3.5, 4, 5, 6, 8, 10, 12, 14, 16, 18, 20, 22, 24, or the like hours, 1.5, 2, 3, 5, 7, 10, 14, 21, or the like days, 4, 5, 6, 7, 8, 9, 10, 12, 14, 16, 18, 20, 25, or the like weeks. Block 216 of FIG. 3 illustrates that a geo-location requirement may also be determined for user verification. The geo-location requirement may include a location boundary within which the user 4 may enter into subsequent interactions without having to re-verify. The geo-location requirement may be the same as location requirement, which was used to verify the entity. Alternatively, the geo-location requirement may be greater than or less than the location requirement previous set. It should be understood that like the location requirement, the time requirement and/or the geo-location requirement may be set by the user 4, the organization, the entity responsible for the security system 30 (e.g., the organization or another entity), or a combination thereof.

Block 218 of FIG. 3 illustrates that the one or more subsequent interactions are allowed should the time requirement and//or geo-location requirement be met. Alternatively, block 220 of FIG. 3 illustrates that the one or more subsequent interactions may require additional verification if the time requirement and/or geo-location requirement fail to be met. As such, the process may return to blocks 204 and 206 should the additional verification be required.

There may be situations in which the re-verification of the user may not be required even if a subsequent interaction has violated the time requirement and/or the geo-location requirement. For example, a user may be verified for an interaction within a first location (e.g., city 1), and the time requirement is set for "X" hours (e.g., 24 hours) within the geo-location requirement of the first location (e.g., city 1). However, if the user is moving (e.g., traveling) there may be instances in which the user verification should be maintained outside of the time requirement and/or geo-location requirement. That is, verification exceptions may be set, and when met, user verification may not be required when user verification would otherwise need to occur for subsequent interactions.

As such, the system may determine if the user is traveling to another location and determine whether or not any validation exceptions are met before determining if re-validation of the user is required for a subsequent interaction. For example, the system may track the interactions of the user and identify that the user is located at an airport, stopping at locations along a major highway, located at a train stations, or involved in one or more interactions that illustrate that the user is moving to another destination. The location of the interactions may be based on the user computer system and/or third-party entity information (e.g., based on POS locations, MCC codes, addresses associated with resource pools, or the like). Moreover, the system may be able to identify past interactions related to travel on the present day. For example, should the user have entered into travel related interactions in the past (e.g., purchased airplane, bus, train, ride sharing, tickets or the like) the system may determine that the user is traveling to another location on a particular date or time, and as such, may make an exception to the time or geo-location requirement for maintaining verification of the user because such past interactions meet validation exceptions (e.g., require reverification except when past purchases and/or personal calendars indicate the user is traveling).

In other examples, verification exceptions may also be determined based on the identifying that the user computer system 20 is located at a travel location. That is, when the location determination of a user computer system 20 indicates that the user is located at travel locations, such as at an airport, train station, or the like, validation exceptions may be met. As such, the user's location determination device may be compared to travel locations (e.g., store in a map database, or the like) in order to determine if the user is traveling, and thus reverification is not required.

Furthermore, the system may be able to determine that the user computer system 20 is connecting (or trying to connect) to wireless networks within a travel location (e.g., airports, train stations, or the like) or between locations at which interactions were entered. As such, even if the user enters into an interaction in a first location, and thereafter enters into a interaction in a second location that violates the geo-location requirement, but otherwise meets the time requirement, the user may remain verified should the system identify that the user computer system has connected (or tried to connect) to a wireless network at travel locations at the first location, the second locations, and/or locations between the first and second location (e.g., connected to an airplane, train, or other business wireless network). As such, a validation exception may be met should the system identify that the user traveled between the first location and the second location of the separate interactions.

In still other examples, the user's location, and/or the IP addresses and/or wireless connections may be identified and compared to past user locations, and/or IP addresses and/or wireless networks in order to determine whether or not the new interaction requires reverification of the user even though the geo-location requirement may be violated. As such, should the user's location, IP address, and/or wireless network to which the user is connected be the same as past user locations, IP addresses, and/or wireless networks, the interaction may be allowed without having to re-verify the user (as described herein). In some embodiments, the user location and IP address and/or wireless network location may be compared with each other in order to determine if the user location meets a verification exception.

As such, it should be understood that in some embodiments of the invention verification exceptions may be met, such that even if the user has violated the time requirement and/or geo-location requirement with a subsequent interaction that would typically require re-verification, the system may have enough confidence in the identity of user based on other factors, that the re-verification of the user is not required.

The embodiments of the present invention provide an improved verification of users 4 involved in interactions, which improves the security of interactions and reduces potential misappropriation of resources involved within the interaction. Traditional card-present interactions may have improved security by identifying the location of a user's mobile device when the user is entering into an interaction using a physical card; however, when the user is using the user computer system 20 itself to enter into the interaction (e.g., at a Point-of-Sale, away from the POS, such as at home, through a web site, mobile application, or the like) it may be more difficult to verify the user's identity. In interactions in which the user 4 is using the user computer system 20 (e.g., mobile device, personal computer, or the like) there is nothing with which to compare the user computer system location. As such, the present invention utilizes the one or more resource accessories 6 as a second location determination for the user 4 in order to provide additional verification of the user 4. Alternatively, or additionally, a resource action may be required with respect to the resource accessory 6 before allowing an interaction. In this way, the location of two systems and/or actions with the resource accessory 6 are utilized to provide additional security for interactions between a user 4 and a third-party entity.

It should be understood that the systems described herein may be configured to establish a communication link (e.g., electronic link, or the like) with each other in order to accomplish the steps of the processes described herein. The link may be an internal link within the same entity (e.g., within the same organization) or a link with the other systems. In some embodiments, the one or more systems may be configured for selectively responding to dynamic inquires. These feeds may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that the systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing using a special conversion program, or it may involve a complex process of going through intermediary stages or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random-access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. An interaction security system for user verification, the system comprising:
    one or more memory components having computer readable code stored thereon; and
    one or more processing components operatively coupled to the one or more memory components, wherein the one or more processing components are configured to execute the computer readable code to:
        receive an indication of an interaction involving a user with a second entity, wherein the user entered the interaction through a user computer system, wherein the interaction is a transaction in which the user provides resources in exchange for a product;
        identify a user computer system location of the user computer system, wherein the user computer system location is based on a location determination component of the user computer system;
        identify a resource accessory location of a resource accessory, wherein the resource accessory comprises an electronic card that has one or more resource accessory processing components and one or more resource accessory communication components, wherein the resource accessory is the resource accessory of the user, wherein the resource accessory location of the resource accessory is based on a location determination component of the resource accessory;
        determine when the user computer system location and the resource accessory location meet a location requirement;
        verify the user for the interaction when the location requirement is met; and
        fail to verify the user for the interaction when the location requirement fails to be met.

2. The system of claim 1, wherein upon the verification of the user a time requirement is set in which a plurality of future interactions fail to require additional verification.

3. The system of claim 1, wherein upon the verification of the user a geo-fenced requirement is set in which a plurality of future interactions fail to require additional verification.

4. The system of claim 1, wherein the one or more processing components are configured to execute the computer readable code to:
    allow the interaction when the location requirement is met; and
    prevent the interaction when the location requirement fails to be met.

5. The system of claim 1, wherein the one or more processing components are configured to execute the computer readable code to:
receive an indication of a second interaction involving the user;
determine a time requirement for allowing subsequent interactions;
determine when a second interaction time of the second interaction meets the time requirement; and
verify the user for the second interaction when the time requirement is met.

6. The system of claim 5, wherein the one or more processing components are further configured to execute the computer readable code to:
allow the second interaction when the time requirement is met;
when the time requirement fails to be met:
identify the user computer system location;
identify the resource accessory location, wherein the resource accessory is the resource accessory of the user;
determine when the user computer system location and the resource accessory location meets the location requirement;
verify the user for the second interaction when the location requirement is met.

7. The system of claim 1, wherein the one or more processing components are configured to execute the computer readable code to:
receive an indication of a second interaction involving the user;
determine a geo-fenced requirement for allowing subsequent interactions;
determine when a second interaction location of the second interaction meets the geo-fenced requirement; and
verify the user for the second interaction when the geo-fenced requirement is met.

8. The system of claim 7, wherein the one or more processing components are further configured to execute the computer readable code to:
allow the second interaction when the geo-fenced requirement is met;
when the geo-fenced requirement fails to be met:
identify the user computer system location;
identify the resource accessory location, wherein the resource accessory is the resource accessory of the user;
determine when the user computer system location and the resource accessory location meets the location requirement; and
verify the user for the second interaction when the location requirement is met.

9. The system of claim 1, wherein the electronic card comprises a display card, a smartcard, or a payment fob.

10. The system of claim 1, wherein the location determination component of the user computer system or the location determination component of the resource accessory utilizes global positioning satellites (GPS), WiFi triangulation, near-field communication, or z-wave.

11. The system of claim 1, wherein the one or more processing components are further configured to execute the computer readable code to:
prompt the user to take an action with the resource accessory;
receive an indication of the action from the resource accessory that the action is completed; and
wherein verification of the user is not completed until the action on the resource accessory is completed.

12. The system of claim 11, wherein the action on the resource accessory comprises turning the resource accessory on, entering a password into the resource accessory, making a gesture on the resource accessory, or entering a pin from the resource accessory into the user computer system.

13. A computer implemented method for an interaction security system for user verification, the method comprising:
receiving, by one or more processors, an indication of an interaction involving a user with a second entity, wherein the user entered the interaction through a user computer system, wherein the interaction is a transaction in which the user provides resources in exchange for a product;
identifying, by the one or more processors, a user computer system location of the user computer system, wherein the user computer system location is based on a location determination component of the user computer system;
identifying, by the one or more processors, a resource accessory location of a resource accessory, wherein the resource accessory comprises an electronic card that has one or more resource accessory processing components and one or more resource accessory communication components, wherein the resource accessory is the resource accessory of the user, wherein the resource accessory location of the resource accessory is based on a location determination component of the resource accessory;
determining, by the one or more processors, when the user computer system location and the resource accessory location meet a location requirement;
verifying, by the one or more processors, the user for the interaction when the location requirement is met; and
fail to verify the user for the interaction when the location requirement fails to be met.

14. The method of claim 13, further comprising:
receiving, by the one or more processors, an indication of a second interaction involving the user;
determining, by the one or more processors, a time requirement for allowing subsequent interactions;
determining, by the one or more processors, when a second interaction time of the second interaction meets the time requirement; and
verifying, by the one or more processors, the user for the second interaction when the time requirement is met.

15. The method of claim 13, further comprising:
receiving, by the one or more processors, an indication of a second interaction involving the user;
determining, by the one or more processors, a geo-fenced requirement for allowing subsequent interactions;
determining, by the one or more processors, when a second interaction location of the second interaction meets the geo-fenced requirement; and
verifying, by the one or more processors, the user for the second interaction when the geo-fenced requirement is met.

16. The method of claim 13, wherein the electronic card comprises a display card, a smartcard, or a payment fob.

17. The method of claim 13, further comprising:
prompting, by the one or more processors, the user to take an action with the resource accessory;
receiving, by the one or more processors, an indication of the action from the resource accessory that the action is completed; and wherein the verification of the user is not completed until the action on the resource accessory is completed.

18. A computer program product for an interaction security system for user verification, the computer program product comprising at least one non-transitory computer-readable medium having computer-readable program code portions embodied therein, the computer-readable program code portions comprising:
an executable portion configured to receive an indication of an interaction involving a user with a second entity, wherein the user entered the interaction through a user computer system, wherein the interaction is a transaction in which the user provides resources in exchange for a product;
an executable portion configured to identify a user computer system location of the user computer system, wherein the user computer system location is based on a location determination component of the user computer system;
an executable portion configured to identify a resource accessory location of a resource accessory, wherein the resource accessory comprises an electronic card that has one or more resource accessory processing components and one or more resource accessory communication components, wherein the resource accessory is the resource accessory of the user, wherein the resource accessory location of the resource accessory is based on a location determination component of the resource accessory;
an executable portion configured to determine when the user computer system location and the resource accessory location meets a location requirement;
an executable portion configured to verify the user for the interaction when the location requirement is met; and
an executable portion configured to fail to verify the user for the interaction when the location requirement fails to be met.

19. The computer program product of claim 18, wherein the computer-readable program code portions further comprise:
an executable portion configured to receive an indication of a second interaction involving the user;
an executable portion configured to determine a time requirement for allowing subsequent interactions;
an executable portion configured to determine when a second interaction time of the second interaction meets the time requirement; and
an executable portion configured to verify the user for the second interaction when the time requirement is met.

20. The computer program product of claim 18, wherein the electronic card comprises a display card, a smartcard, or a payment fob.

* * * * *